United States Patent
Karabinis et al.

(10) Patent No.: US 8,670,705 B2
(45) Date of Patent: *Mar. 11, 2014

(54) ADDITIONAL INTRA-AND/OR INTER-SYSTEM INTERFERENCE REDUCING SYSTEMS AND METHODS FOR SATELLITE COMMUNICATIONS SYSTEMS

(75) Inventors: Peter D. Karabinis, Cary, NC (US); Santanu Dutta, Cary, NC (US); Gary G. Churan, Annandale, VA (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 2816 days.

This patent is subject to a terminal disclaimer.

(21) Appl. No.: 11/036,637

(22) Filed: Jan. 14, 2005

(65) Prior Publication Data

US 2005/0136836 A1 Jun. 23, 2005

Related U.S. Application Data

(63) Continuation-in-part of application No. 10/890,758, filed on Jul. 14, 2004, now Pat. No. 7,340,213.

(60) Provisional application No. 60/490,993, filed on Jul. 30, 2003.

(51) Int. Cl.
*H04B 7/185* (2006.01)

(52) U.S. Cl.
USPC ........... 455/12.1; 455/427; 370/316; 370/317

(58) Field of Classification Search
CPC .................................. H04B 7/185; H04B 7/04
USPC .............. 455/12.1, 13.1–13.4, 427, 429–431, 455/101, 103, 3.02; 370/316–317; 375/267, 375/299, 346, 347, 349, 144, 148
See application file for complete search history.

(56) References Cited

U.S. PATENT DOCUMENTS

| 4,901,307 | A | | 2/1990 | Gilhousen et al. |
| 5,073,900 | A | * | 12/1991 | Mallinckrodt ................ 370/320 |

(Continued)

FOREIGN PATENT DOCUMENTS

| EP | 0 506 255 A2 | 9/1992 |
| EP | 0 597 225 A1 | 5/1994 |

(Continued)

OTHER PUBLICATIONS

Notification of Transmittal of the International Search Report and the Written Opinion of the International Searching Authority, of the Declaration, PCT/US04/22960, Jun. 1, 2005.

(Continued)

*Primary Examiner* — Nay A Maung
*Assistant Examiner* — Angelica M Perez
(74) *Attorney, Agent, or Firm* — Myers Bigel Sibley & Sajovec, P.A.

(57) ABSTRACT

First radio signals are received by a first satellite, the received first radio signals including a desired satellite uplink signal transmitted from a first source using a frequency assigned to the first source and an interfering signal transmitted from a second source using the frequency assigned to the first source. The first radio signals are combined based on a first performance criterion to generate a first output signal. Second radio signals are received by a second satellite, the received second radio signals including a measure of the desired signal. The second radio signals are combined based on a second performance criterion to produce a second output signal. The first and second output signals are combined to generate an estimate of the desired satellite uplink signal.

20 Claims, 7 Drawing Sheets

(56) References Cited

U.S. PATENT DOCUMENTS

| | | |
|---|---|---|
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A * | 9/1998 | Dent .................... 455/427 |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,901,343 A | 5/1999 | Lange |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,741,838 B2 * | 5/2004 | Tsujimoto .................... 455/101 |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,641 B2 | 2/2005 | Collins et al. |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,340,213 B2 * | 3/2008 | Karabinis et al. ........... 455/12.1 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0022635 A1 | 1/2003 | Benning et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0042569 A1 * | 3/2004 | Casabona et al. ............. 375/346 |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis et al. |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0259504 A1 | 12/2004 | Onggosanusi et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040659 A1 | 2/2006 | Karabinis |

FOREIGN PATENT DOCUMENTS

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| JP | 08-331030 A | 12/1996 |
| JP | 2001-086054 A | 3/2001 |
| JP | 07-067172 A | 3/2005 |
| WO | WO 01/54314 A1 | 7/2001 |
| WO | WO 2004/100501 | 11/2004 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

International Search Report and Written Opinion of the International Searching Authority for International patent application No. PCT/US2005/024458 mailed on Dec. 1, 2005.

(56) References Cited

OTHER PUBLICATIONS

Mizuike et al. "Optimization of Frequency Assignment" *IEEE Transactions on Communications* 37(10): 1031-1041 (1989).
EPO Communication with Supplementary Search Report, EP Application No. 04809498.1, Nov. 18, 2009.
JP Office Action dated Jun. 4, 2010, Ref. JP Application No. 2006-521884, 11 pages.
Riccardo De Gaudenzi, et al., "DS-CDMA Satellite Diversity Reception for Personal Satellite Communication: Satellite-to-Mobile Link Performance Analysis", Transactions on Vehicular Technology, US, IEEE, Aug. 6, 2002, vol. 47, Issue 2, pp. 658-672.

* cited by examiner

ADDITIONAL INTRA- AND/OR INTER-SYSTEM INTERFERENCE REDUCING SYSTEMS AND METHODS FOR SATELLITE COMMUNICATIONS SYSTEMS

RELATED APPLICATIONS

The present application is a continuation-in part of U.S. application Ser. No. 10/890,758 entitled Intra- And/Or Inter-System Interference Reducing Systems and Methods for Satellite Communications Systems, filed Jul. 14, 2004, now U.S. Pat. No. 7,340,213 which claims priority to U.S. Provisional Application Ser. No. 60/490,993, also entitled Intra- And/Or Inter-System Interference Reducing Systems and Methods for Satellite Communications Systems, filed Jul. 30, 2003, the disclosures of which are incorporated herein by reference in their entirety.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single beam (cell) covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular/PCS radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. Radiotelephones may also be referred to herein as "radioterminals" or simply "terminals".

As is well known to those having skill in the art, terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., in densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

U.S. Pat. No. 6,684,057, to coinventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radiotelephone frequency can be reused terrestrially by an ancillary terrestrial network even within the same satellite cell, using interference cancellation techniques. In particular, the satellite radiotelephone system according to some embodiments of published patent application 2003/0054760 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

U.S. patent application Publication No. 2003/0054761 A1, published Mar. 20, 2003 to coinventor Karabinis and entitled Spatial Guardbands for Terrestrial Reuse of Satellite Frequencies, the disclosure of which is hereby incorporated herein by reference in its entirety as if set forth fully herein, describes satellite radiotelephone systems that include a space-based component that is configured to provide wireless radiotelephone communications in a satellite footprint over a satellite radiotelephone frequency band. The satellite footprint is divided into a plurality of satellite cells, in which satellite radiotelephone frequencies of the satellite radiotelephone frequency band are spatially reused. An ancillary terrestrial network is configured to terrestrially reuse at least one of the satellite radiotelephone frequencies that is used in a satellite cell in the satellite footprint, outside the cell and in some embodiments separated therefrom by a spatial guardband. The spatial guardband may be sufficiently large to reduce or prevent interference between the at least one of the satellite radiotelephone frequencies that is used in the satellite cell in the satellite footprint, and the at least one of the satellite radiotelephone frequencies that is terrestrially reused outside the satellite cell and separated therefrom by the spatial guardband. The spatial guardband may be about half a radius of a satellite cell in width.

SUMMARY OF THE INVENTION

In some embodiments of the present invention, first radio signals are received at a first satellite, the received first radio signals including a desired satellite uplink signal transmitted from a first source using a frequency assigned to the first source and an interfering signal transmitted from a second source using the frequency assigned to the first source. The first radio signals are combined based on a first performance criterion to generate a first output signal. Second radio signals are received at a second satellite, the received second radio signals including the desired signal. The second radio signals are combined based on a second performance criterion to produce a second output signal. The first and second output signals are combined based on a third performance criterion to generate an estimate of the desired satellite uplink signal.

According to some embodiments, a first timing for the desired signal as received at the first satellite is determined by, for example, synchronizing to a timing reference, such as a pilot signal or synchronization sequence. An error of the first output signal is determined responsive to the determined first timing. The first radio signals are combined responsive to the determined error of the first output signal. Similarly, a second timing for the desired signal as received at the second satellite is determined, and an error of the second output signal is determined responsive to the determined second timing. The second radio signals are combined responsive to the determined second error of the second output signal.

In further embodiments, combining the first radio signals based on a first performance criterion to generate a first output signal includes applying the first radio signals to a plurality of filters, combining outputs of the plurality of filters to produce the first output signal and modifying the plurality of filters responsive to the first output signal. Combining the first and second output signals to generate an estimate of the desired satellite uplink signal may include maximal ratio combining the first and second output signals.

According to additional embodiments of the present invention, a satellite radiotelephone communications system includes a first satellite that receives first radio signals including a desired satellite uplink signal transmitted from a first source using a frequency assigned to the first source and an interfering signal transmitted from a second source using the frequency assigned to the first source. The system also includes a second satellite that receives second radio signals including the desired signal. The system further includes an interference-suppressing signal processor configured to combine the first radio signals based on a first performance criterion to generate a first output signal, to combine the second radio signals based on a second performance criterion to produce a second output signal, and to combine the first and second output signals to generate an estimate of the desired satellite uplink signal.

In yet further embodiments, a receiver apparatus includes an interference-suppressing signal processor configured to combine first radio signals from a first satellite based on a first performance criterion to generate a first output signal, to combine second radio signals from a second satellite based on a second performance criterion to produce a second output signal, and to combine the first and second output signals to generate an estimate of the desired satellite uplink signal.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention described herein involve the use of diverse satellite reception paths to receive desired satellite uplink signals and one or more interfering signals. As used herein, a "satellite reception path" generally refers to one or more elements that are configured to receive and convey satellite-received signals, i.e., signals that impinge upon a satellite from, for example, terrestrially positioned sources, such as radiotelephones. Accordingly, a satellite reception path may include, but is not limited to, a satellite antenna, a spot beam supported by a satellite antenna, electronic circuitry that receives and transports signals received by a satellite antenna, and terrestrially-based antennas and hardware that receive a satellite-received signal via, for-example, a "bent pipe," "regenerative," "non-regenerative" and/or other satellite relay mechanism. As used herein, a "radio signal" received by such a satellite reception path may include a radio-frequency carrier modulated signal transmitted by a source and/or data, voice or other signals combined with or embedded in such a radio-frequency signal.

Some embodiments of the present invention will be described herein relative to first and second satellite radiotelephone communications systems. For convenience, the first satellite radiotelephone communications system, and components thereof, may be referred to as "MSV" and may, in some embodiments, correspond to a satellite radiotelephone system provided by Mobile Satellite Ventures, LP, the assignee of the present invention. The second satellite radiotelephone system and/or components thereof may be referred to as "non-MSV". However, it will be understood that the invention is not limited to applications involving combinations of MSV and non-MSV systems, and that any first and second satellite radiotelephone communications systems may be encompassed by the designations MSV and non-MSV.

Figure 1:
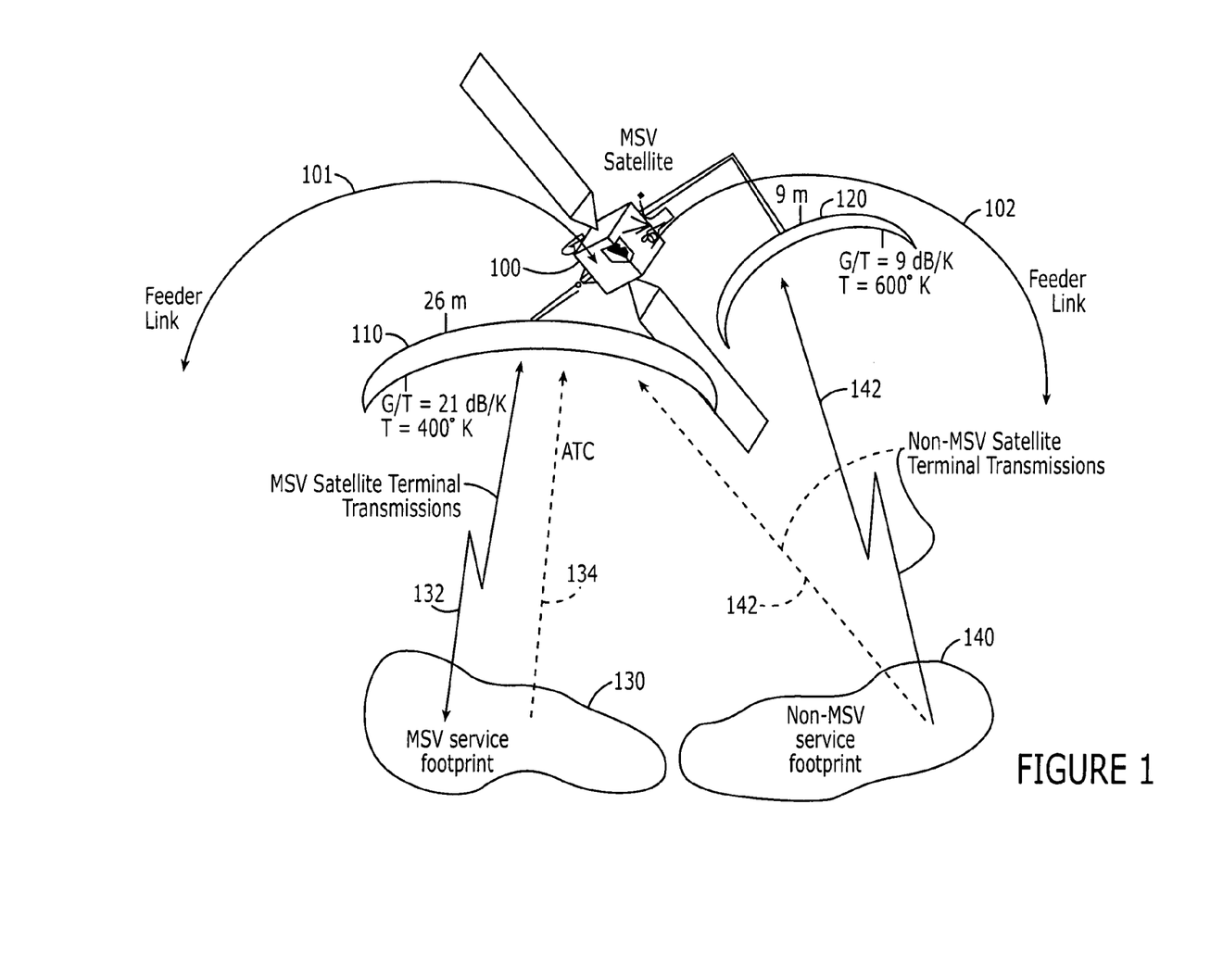
FIG. 1 is a schematic diagram illustrating a satellite communications system and operations thereof according to some embodiments of the present invention.

FIG. 1 illustrates a satellite 100 that is configured with two antennas 110, 120 according to some embodiments of the present invention. The antennas 110, 120 of the satellite 100 may be of different sizes (in the illustrated embodiments, 26 meters and 9 meters, respectively) and may be directed toward different service footprints 130, 140. The service footprints may be disjoint (as is illustrated in FIG. 1), may have some overlap, or be fully overlapping. Specifically, FIG. 1 shows the larger one 110 of the two satellite antennas 110, 120 directed toward an area 130 labeled "MSV service footprint", while the smaller antenna 120, also referred to herein as an ancillary antenna, is directed toward an area 140 labeled "non-MSV service footprint." The smaller antenna 120 may be configured to receive only. The larger antenna 110 may be configured to receive and transmit. Each antenna 110, 120 may be configured to form a plurality of spot beams (cells) over its respective footprint or area.

Satellite terminal transmissions 142 that may be intended for a non-MSV satellite (such as an Inmarsat satellite) may also be intercepted (intentionally or unintentionally) by at least one MSV satellite. At least some satellite terminal transmissions by non-MSV satellite terminals may be co-channel with at least some of MSV's satellite terminal transmissions. Thus, at least some satellite terminal transmissions by non-MSV satellite terminals that are intended for a non-MSV satellite and are co-channel with at least some satellite terminal transmissions 132 of MSV's satellite terminals (intended for MSV's satellite(s)) may cause co-channel interference to at least some of MSV's satellite receivers. According to some embodiments of the present invention, systems and methods are provided that are capable of adaptively mitigating the effects of inter-system co-channel interference in order to allow improved communications performance and also to potentially facilitate more efficient reuse of radio frequency resources between systems.

At least one ancillary antenna on an MSV satellite (the smaller antenna 120 on the MSV satellite of FIG. 1) may be configured and/or positioned to maximize its reception of emissions by non-MSV satellite terminals that are intended for a non-MSV satellite. This antenna, thus configured and/or positioned, may receive substantially strong interference signals that may be used at an MSV infrastructure element (such as a satellite gateway) to mitigate (reduce, suppress or substantially eliminate) interference signals that may be received by the MSV satellite antenna whose mission is to provide communications service to MSV's user terminals over MSV's service area.

Still referring to FIG. 1, an Ancillary Terrestrial Network (ATN) comprising a plurality of Ancillary Terrestrial Components (ATCs) may be deployed over certain areas of MSV's service footprint 130. An ATC comprises one or more radiating infrastructure elements, such as a base station with associated back-end infrastructure. At least one radioterminal may communicate with the at least one radiating infrastructure element. Signals 134 that are radiated by an ATC and/or by a radioterminal that may be communicating with an ATC and/or a satellite may inadvertently be intercepted by MSV's satellite(s) 100, causing additional interference.

According to some embodiments of the present invention, the Space Based Network (SBN), including a Space Based Component (SBC) (e.g., at least one satellite) and ground infrastructure (e.g., at least one gateway), includes systems and/or methods for adaptively mitigating interference received from at least certain elements of the ATN and/or radioterminals. According to some embodiments of the present invention, the SBN also includes systems and/or methods that are capable of adaptively mitigating interference caused by intra-system and/or inter-system frequency reuse.

Figure 2:
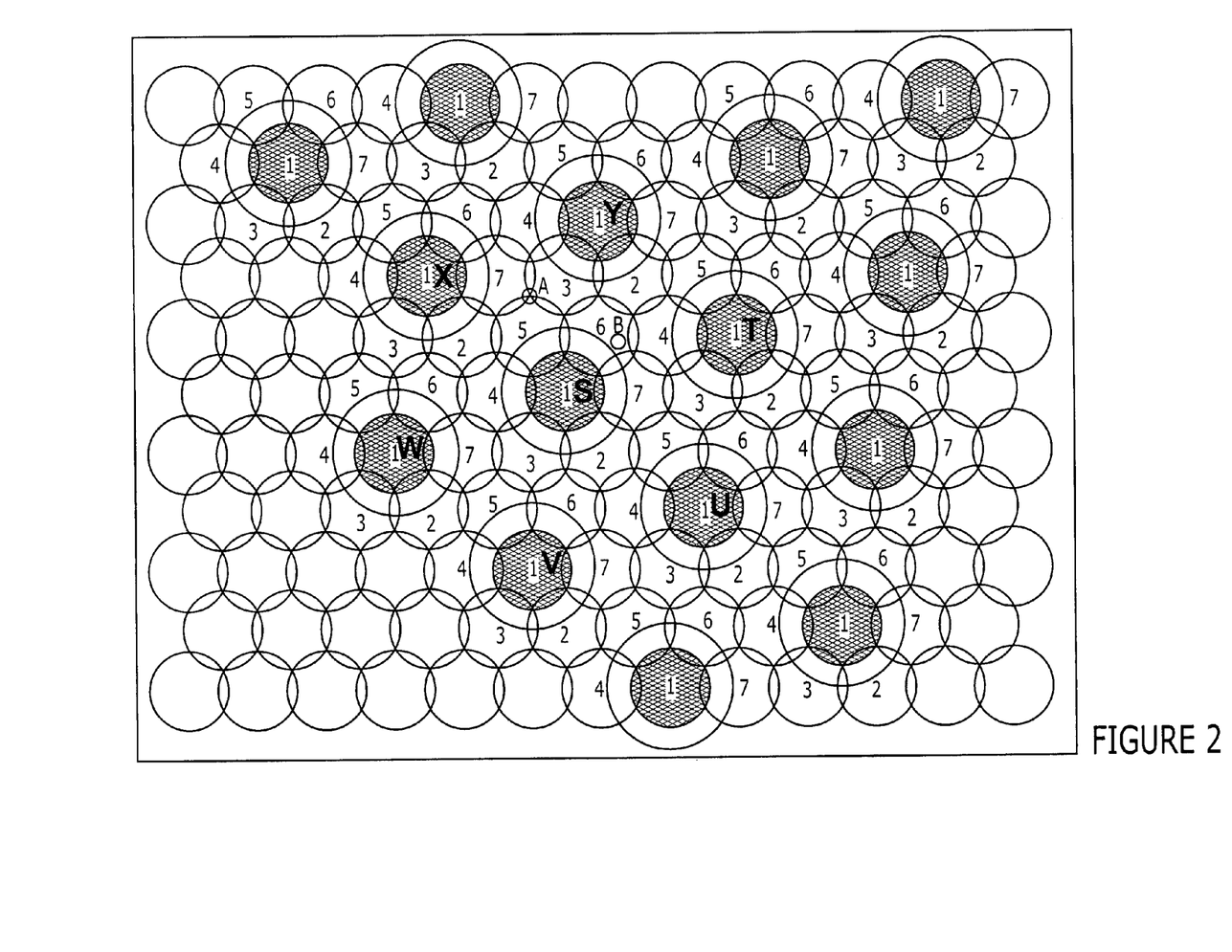
FIG. 2 is a cell layout diagram illustrating exemplary operations of a satellite communications system according to further embodiments of the present invention.

FIG. 2 illustrates an example of intra-system frequency reuse. As is illustrated in FIG. 2, a given frequency set, frequency set 1 for example, may be used and reused for satellite communications over at least a portion of a system's footprint in accordance with, for example, a seven-cell frequency reuse pattern. A given satellite cell, such as satellite cell S, configured to receive at least some frequencies of frequency set 1 from radioterminals that are operative over its footprint, may also receive interference from other intra-system terminal emissions intended, for example, for satellite cells T through Y that may be radiating at least some of the same frequencies as the radioterminals that are operative over satellite cell S. FIG. 2 also illustrates the location of two ATCs, labeled as A and B, which may also be reusing all or some of the frequencies of frequency set 1. Thus, ATC emissions of ATC A and/or B may also cause interference to one or more receivers associated with satellite cell S and/or other satellite cells. Spatial guardbands, as described in the above-cited U.S. patent application Publication No. 2003/0054761 A1, are shown by the unshaded rings of FIG. 2.

Referring to FIGS. 1 and 2 and to the satellite antenna 110 that is serving MSV's service footprint 130 (see FIG. 1), at least some signals of at least some of the neighboring satellite cells of a given satellite cell, such as satellite cell S, may contain signals that are correlated with at least some components of an aggregate interference of the given satellite cell (such as satellite cell S). Such signals may be transported to, for example, a satellite gateway via a satellite feeder link, such as the satellite feeder link 101 illustrated on the left-hand side of FIG. 1, to serve as inputs to an interference suppressor. Relative to the satellite antenna 120 that is directed toward the non-MSV service footprint 140, at least some signals that may be relevant to suppression of interference that may be received by the satellite antenna 110 serving the MSV footprint 130, may be transported to, for example, an MSV satellite gateway via a satellite feeder link, such as the satellite feeder link 102 illustrated on the right-hand side of FIG. 1.

The two satellite feeder links 101, 102 illustrated in FIG. 1 may use different frequencies and/or different frequency bands to transmit information to the ground to two or more spatially proximate or spatially distant receive antennas. In some embodiments the information transported to the ground (i.e., to a satellite gateway) by the feeder links 101, 102 illustrated in FIG. 1 may be accommodated by a single feeder link using the frequencies of a single frequency band. In other embodiments, a satellite may be configured with two or more feeder links, using the frequencies of one or more frequency bands, to transport information from the satellite to at least one ground facility (i.e., a satellite gateway) via spatially separate and/or spatially proximate feeder link receive antennas on the ground.

Figure 3:
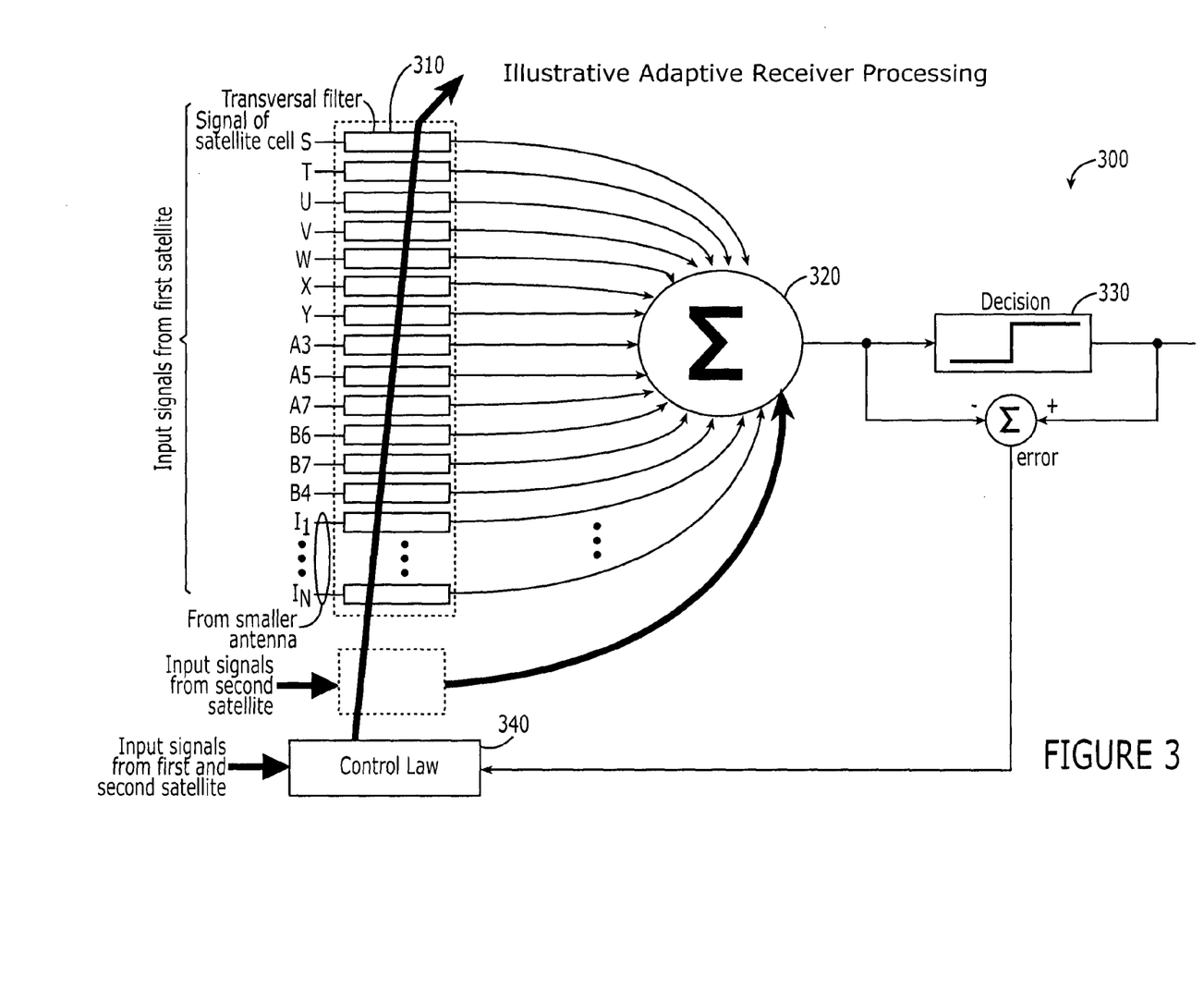
FIG. 3 is a schematic diagram of an interference-suppressing signal processor according to some embodiments of the present invention.

FIG. 3 illustrates an architecture of an adaptive receiver 300, also referred to as an adaptive interference reducer, that may be configured at a satellite gateway (and/or other location) to suppress interference that may be generated by intra- and/or inter-system frequency reuse. Specifically, the receiver architecture of FIG. 3 is shown operative to suppress interference that may be superimposed on a given "desired signal" received by satellite cell S. As such, the receiver 300 depicted in FIG. 3 combines (in a combiner 320), in accordance with a control law or performance index (of a controller 340), such as a Least Mean Squared Error (LMSE) control law or performance index, via a plurality of (fractionally- and/or synchronously-spaced, feed-forward and/or decision-feedback) transversal filters 310, a plurality of signal inputs from a plurality of satellite cells that may be formed by one or more satellite antennas and/or satellites, to form a decision variable for recovering a desired signal in a detector 330.

Those skilled in the art will recognize that different control laws (other than LMSE), such as zero-forcing, may be used to form and/or update the transversal filter coefficients. Those skilled in the art will also recognize that different control law input signals may be required by the different control laws to derive update information for the plurality of transversal filter coefficients.

For example, in accordance with a zero-forcing control law, the error quantity (see FIG. 3) and the output of the decision stage of FIG. 3 may serve as inputs to the control law. It will also be recognized by those of skill in the art that the number of transversal filter coefficients per transversal filter need not be the same over the ensemble of transversal filters depicted in FIG. 3. Some transversal filters may, for example, have seven (7) coefficients or taps, while others may have five (5) or only three (3) and some transversal filters may be limited to a single coefficient. In some embodiments, all transversal filters have an identical number of coefficients or taps (greater than or equal to one). Furthermore, in some embodiments, the architecture of each transversal filter of the ensemble of transversal filters of FIG. 3 may not be the same for all transversal filters of the ensemble. For example, some transversal filters may be synchronously-spaced, others fractionally-spaced, and others decision-feedback with either synchronously- or fractionally-spaced feed-forward sections.

Referring again to FIG. 3, it is seen that the top (first) transversal filter input labeled "signal of satellite cell S" denotes the desired signal plus interference, as received by satellite cell S (see FIG. 2). The transversal filter inputs T through Y represent signals that may be correlated with the desired signal of satellite cell S and/or with the interference signal(s) of satellite cell S that may be due to intra- and/or inter-satellite system frequency reuse. These signals T through Y represent signals from adjacent satellite system cells that use the same frequency or frequencies as cell S. It will be understood that non-adjacent satellite cells that use the same frequency or frequencies as satellite cell S, shown by some or all of the cross-hatched cells and/or some or all of the non-cross-hatched cells of FIG. 2, other that cells S-Y, may also provide signals to other transversal filters of the ensemble of transversal filters (not shown) and thus also contribute elements to combining junction 320 of FIG. 3.

The transversal filter inputs A3 through A7 and B6 through B4 represent signals that may be correlated with, among other signals, the interference components of the signal of satellite cell S generated by ATC A and B, respectively. Fewer or more A and/or B signals and a correspondingly fewer or more transversal filters than the numbers shown in FIG. 3 may be provided in some embodiments. In particular, in FIG. 3, the signals from the three adjacent cells to an ATC that is terrestrially reusing the same frequency or frequencies as satellite cell S are provided. Thus, for ATC A, the signals from satellite cells 3, 5 and 7 are provided as inputs, and for ATC B, the signals from satellite cells 4, 6 and 7 are provided. In other embodiments, signals from non-adjacent satellite cells also may be provided.

The transversal filter inputs $I_1$ through $I_N$ provide signals from the smaller antenna of FIG. 1, that may be correlated with, among other signals, the interference components of S that are due to inter- and/or intra-system frequency reuse. It is understood that, in general, all transversal filter input signals shown in FIG. 3 may provide both interference and desired signal components.

In some embodiments, the number of antenna(s) of a satellite that may be directed toward another satellite radiotelephone system service footprint may be reduced or eliminated. Thus, in some embodiments, the small antenna of the satellite of FIG. 1 may be eliminated. In such embodiments, the transversal filter inputs $I_1$ through $I_N$ of FIG. 3 may be replaced with signals derived from the co-system (intra-system) satellite antenna cell patterns.

Thus, some embodiments of the present invention can use an adaptive interference reducer to reduce, minimize or eliminate intra- and/or inter-system interference and to improve a desired signal measure by providing as input signals to a plurality of transversal filters, signals of a given satellite cell (such as satellite cell S) and signals of one or more other satellite cells (such as satellite cells T-Y) that reuse and/or receive one or more frequencies of a desired satellite signal of the given satellite cell (such as satellite cell S). Thus, in some embodiments, signals from satellite cells S-Y may be used as inputs to an adaptive interference reducer, to improve a desired signal measure (such as signal strength) of a desired signal, such as a desired signal of satellite cell S, and to reduce interference from co-frequency intra- and/or inter-system reuse. Other embodiments of the present invention can add one or more of the following groups of signals as inputs to an adaptive interference reducer, to further reduce interference and improve the desired signal measure:

(1) Signals from adjacent and/or non-adjacent cells that reuse and/or receive one or more frequencies of a desired satellite signal such as the desired satellite signal of satellite cell S;

(2) Signals from satellite cells whose geographic service area contains an ATC and/or whose antenna pattern receives signals from an ATC (such as, but not limited to, satellite cells 6, 4, 7 that contain and/or receive signals from ATC B. and/or satellite cells 3, 7 and 5, that contain and/or receive signals from ATC A) which is/are terrestrially reusing at least one of the satellite frequencies of a desired satellite signal such as the desired satellite signal of satellite cell S;

(3) Signals from satellite cells that are immediately adjacent a satellite cell described in (2) above; (4) Signals from satellite cells that are remote from the satellite cells described in (2) above;

(5) Signals from an ancillary antenna at the satellite that is pointed at the satellite footprint of another satellite system that reuses at least one of the frequencies of a desired satellite signal such as the desired satellite signal of satellite cell S, for example, input signals $I_1$-$I_N$ of FIG. 3;

(6) Signals from a second satellite in the given satellite radiotelephone system, that receives at least one of the frequencies of the given satellite cell, if the space based network includes multiple satellites, as shown in FIG. 3 by the dashed box labeled "Input signals from second satellite"; and/or (7) Signals from another satellite radiotelephone system that reuses at least one of the frequencies of satellite cell S that may be provided, for example, by a gateway and/or other component of the other satellite radiotelephone system.

Subcombinations and combinations of these input signals also may be provided to the adaptive interference reducer.

Figure 4:
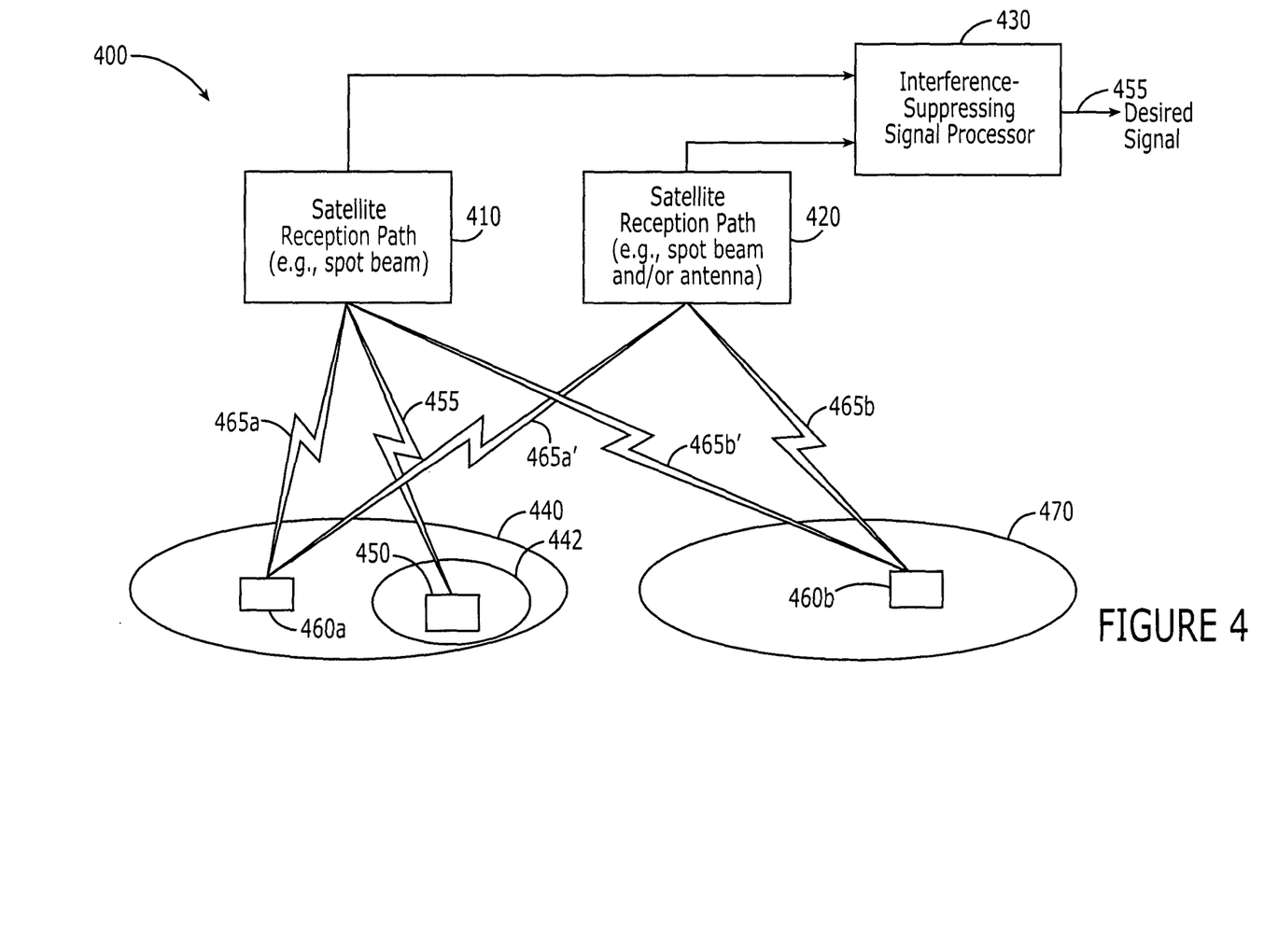
FIGS. 4-6 are schematic diagrams illustrating satellite communications systems and operations thereof according to additional embodiments of the present invention.

Further embodiments of the present invention are illustrated in FIG. 4. As shown in FIG. 4, a system 400 includes first and second satellite reception paths 410, 420. The first satellite reception path 410 serves a satellite cell 442 of a coverage area 440 of a satellite radiotelephone communications system (e.g., the MSV system of FIG. 1). It will be appreciated that the first satellite reception path 410 may include, for example, a spot beam of a satellite (e.g., the satellite 100 of FIG. 1), along with other components for conveying satellite-received signals. The first satellite reception path 410 receives a first signal including a desired signal 455 transmitted by a source 450 (e.g., a subscriber terminal) and an interfering signal transmitted by a second source, which may include, for example, an interfering signal 465a transmitted by a source 460a within the coverage area 440 (e.g., another terminal and/or an ATC) and/or an interfering signal 465b transmitted by a source 460b positioned outside of the coverage area (e.g., in a coverage area 470 of a second satellite communications system).

The signals received by the first and second satellite reception paths 410, 420 are provided to an interference-suppressing signal processor 430, which processes the received signals to recover the desired signal 455. The signal processor 430 may include, for example, an adaptive interference reducer along the lines described above with reference to FIG. 3.

Figure 5:
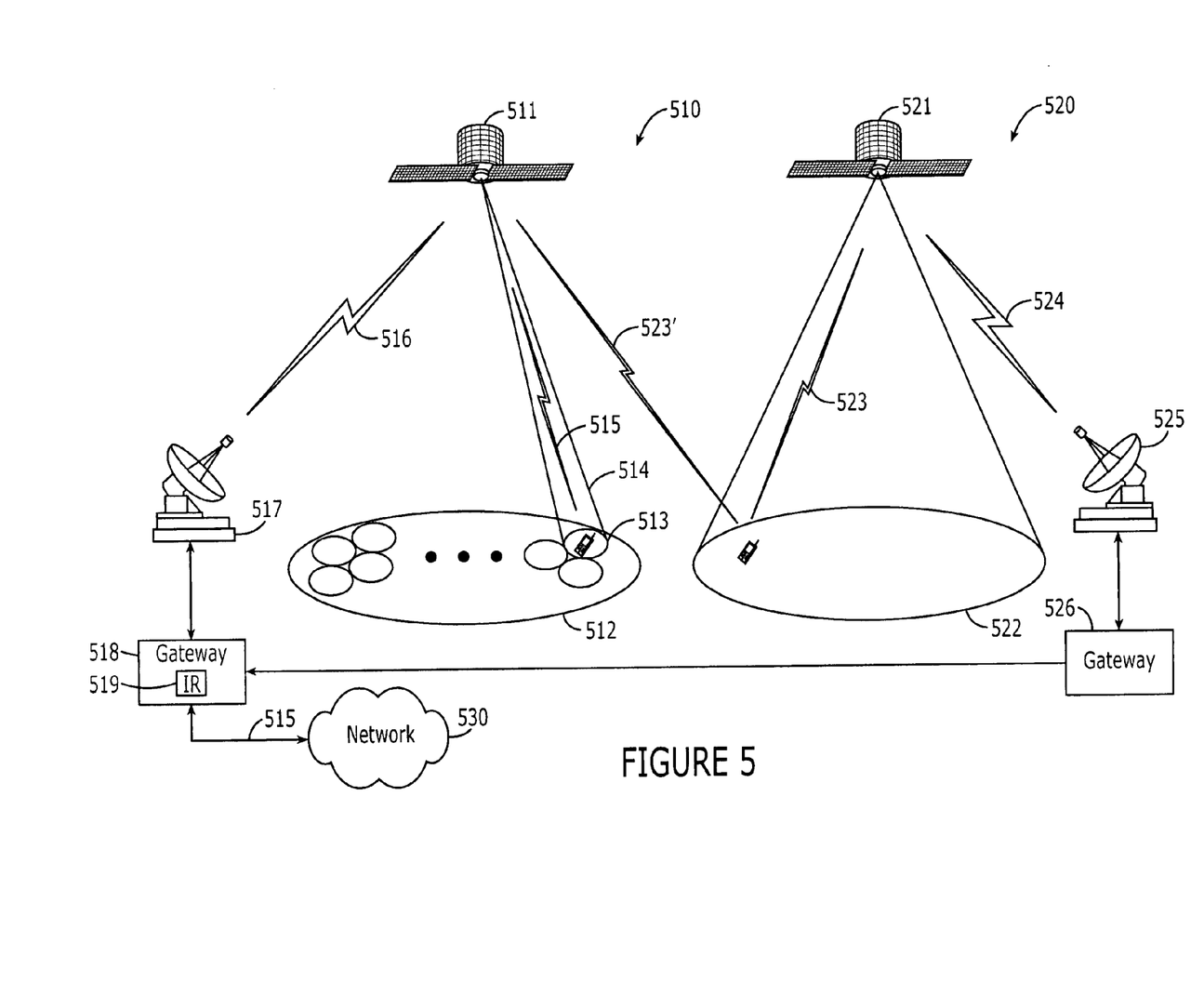

In further embodiments of the present invention, intersystem interference may be suppressed using a satellite reception path that is responsive to elements of an interfering satellite communications system. For example, as shown in FIG. 5, interference in a first satellite radiotelephone communications system 510 introduced by an adjacent or overlapping second satellite communications system 520 may be reduced by capturing feeder downlink signals 524 that include a measure of interfering signals generated by users and/or components of the interfering system 520. In particular, the first satellite radiotelephone communications system 510 includes at least one satellite 511 that supports a satellite reception path that includes a spot beam 514 that serves a satellite cell 513. The spot beam 514 receives a signal including a desired signal 515 transmitted by a terminal in the cell 513 and an interfering signal 523 transmitted by a source that is communicating with a satellite 521, an ATC and/or a radio-terminal of the second system 520. The satellite 521 of the second system 520 receives a signal 523 that includes a measure of the interfering signal 523.

As shown in FIG. 5, the first system 510 includes a gateway 518 served by a terrestrial gateway antenna 517 that receives a feeder downlink signal 516 from the satellite 511. It will be appreciated that the feeder downlink signal 516 includes the signal received by the spot beam 514. The second system 520 similarly includes a gateway 526 that is served by a terrestrial gateway antenna 525 that receives a feeder downlink signal 524 from the satellite 520. It will be further appreciated that the feeder downlink signal 524 includes the terrestrially generated signal 523, received by the satellite 521, and, therefore, a measure of the interference signal 523.

The signal 523 received by the satellite 521 of the second system 520 is conveyed from the gateway 526 of the second system 520 to the gateway 518 of the first system 510. The gateway 518 of the first system 510 may include an interference reducer (IR) 519 that is configured to process the signals received by the first and second satellites 511, 521 to recover the desired signal 515. The recovered signal 515 may be conveyed on to other network components 530, such as telephony network components (switches, routers, etc.) and/or ATN components. It will be appreciated that the IR 519 may receive other signal inputs (not shown in FIG. 5) that provide one or more measures of the same and/or other interference signals, for example, signal inputs from other spot beams, satellite(s), satellite gateway(s), ancillary antennas and/or other satellite system components of the same and/or other satellite system and/or ATC/ATN, for example, along the lines described above with reference to FIGS. 1-4.

Figure 6:
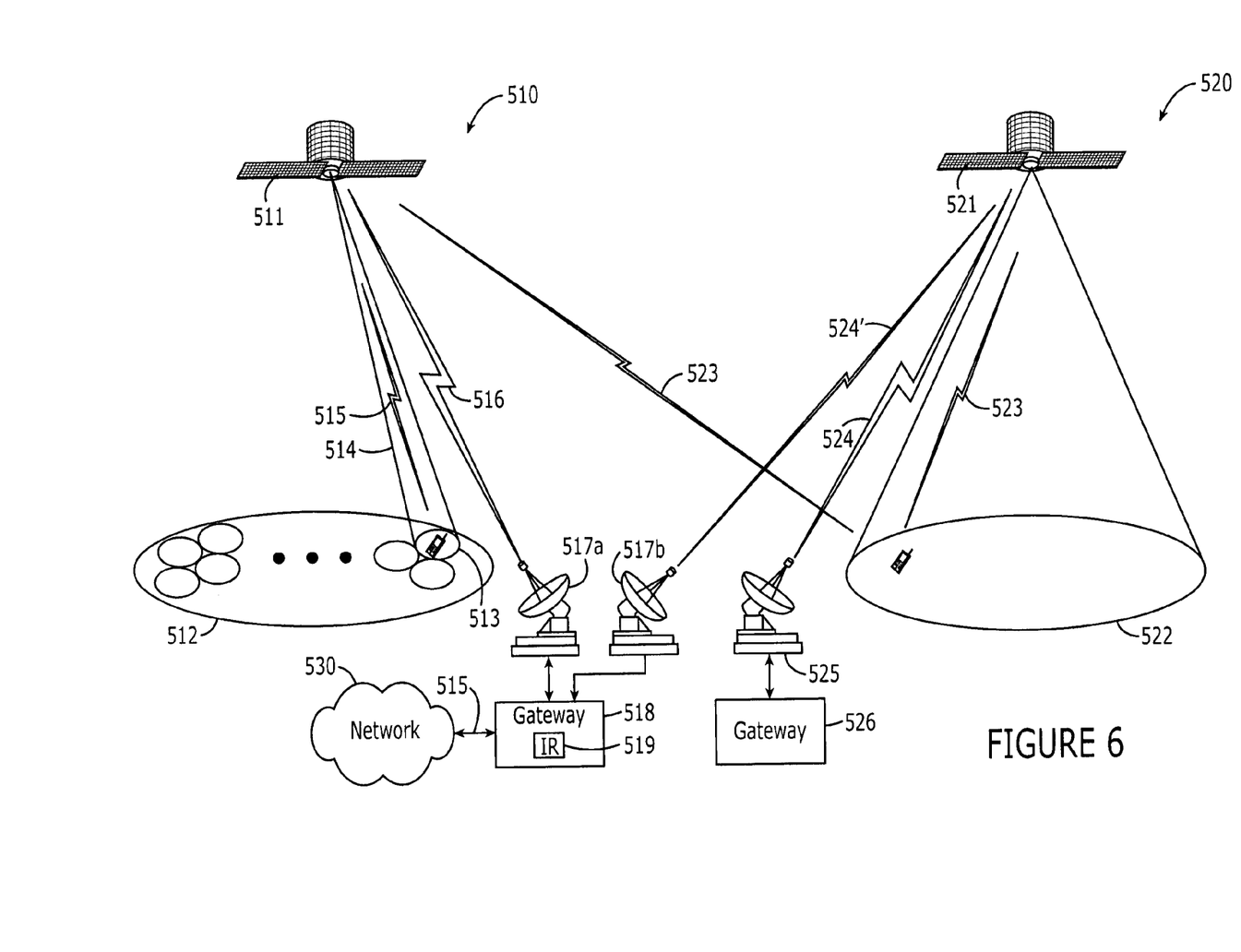

Referring to FIG. 6, in other embodiments of the present invention, for example, in applications in which signals generated in conjunction with an interfering system are not directly available from the interfering system, an interfering signal may be obtained by directly capturing a downlink feeder signal transmitted by the interfering system. For example, in addition to a terrestrial antenna 517a that is configured to receive downlink feeder signals 516 transmitted by the satellite 511 of the first system 510, a terrestrial antenna 517b may be coupled to the gateway 518 of the first system 510 and configured to receive a measure of the downlink feeder signal 524 of the interfering second system 520. It will be appreciated that the first and second antennas 517a, 517b may be physically separate antennas and/or spatially diverse antenna beams supported by a single antenna structure and, for example, a beamforming network. It will be appreciated that the terrestrial antenna 517a may be coupled to the first system 510 in any of a number of different ways. It will be further appreciated that the IR 519 may be positioned in a different component of the first system 510, and may be distributed among multiple components of the first system 510.

In embodiments in which an adaptive interference reducer uses signal information received from different satellites, differences in signal propagation delays between the two satellites may render a receiver along the lines illustrated in FIG. 3 suboptimum. In exemplary embodiments of the present invention illustrated in FIG. 7, an adaptive interference-suppressing signal processor (interference reducer) 700 includes separate combining stages for signals received by separate satellites to accommodate for such timing differences. In particular, signals received at a first satellite, including a desired signal and one or more interfering signals, are filtered by a first set of transversal (or other) filters 710, and the resulting filtered signals are combined at a first summing junction 714. It will be understood that the signals provided to the transversal filters 710 may take many forms. For example, the signals may respectively correspond to respective satellite spot beam signals and/or may include signals received by one or more antenna feed elements of the satellite.

Figure 7:
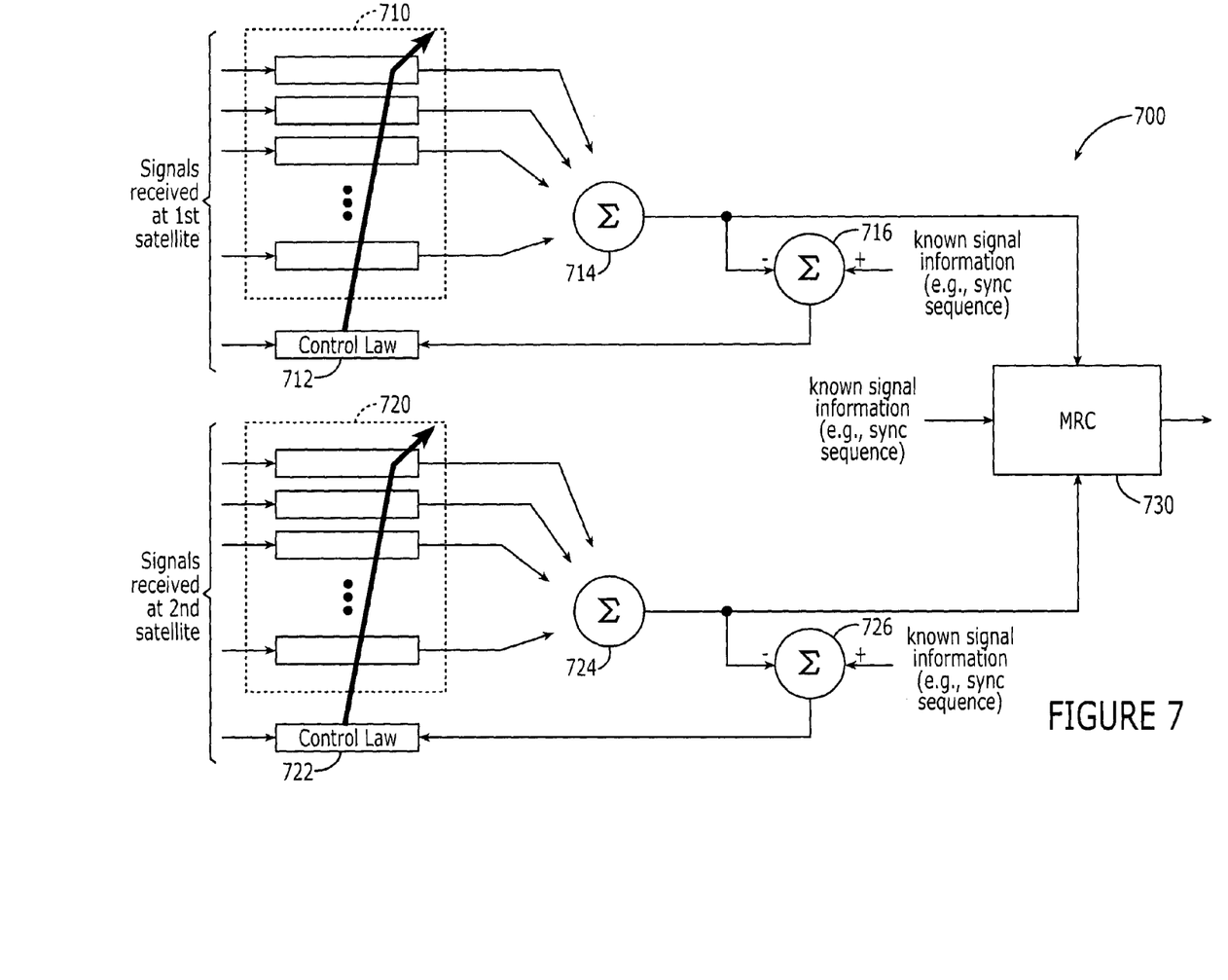
FIG. 7 is a schematic diagram of an interference-suppressing signal processor according to further embodiments of the present invention.

As shown in FIG. 7, a controller 712 adjusts the transversal filter coefficients of transversal filters 710 responsive to an error signal generated by comparing the output of the summing junction 714 and known information present in and/or associated with the desired signal (e.g., a pilot signal and/or a synchronization sequence) at a second summing junction 716. It will be appreciated that the known information may be used to provide a timing reference for this branch of the interference-suppressing signal processor 700, e.g., by providing the interference-suppressing signal processor 700 with information as to the temporal location of particular symbols in the desired signal as received at the satellite.

Similarly, signals received at a second satellite, including the desired signal and one or more interfering signals, are filtered by a second set of transversal filters 720, and the resulting filtered signals combined at a second summing junction 724. A controller 722 adjusts the transversal filters 720 responsive to an error signal generated by comparing the output of the summing junction 724 and known information present in and/or associated with the desired signal (e.g., a pilot signal and/or a synchronization sequence) at a summing junction 726.

It will be appreciated that the adaptive interference-suppressing signal processor 700 may be implemented in a number of different ways. For example, portions of the interference-suppressing signal processor 700 may be positioned at a satellite and/or at gateways or network equipment coupled to a satellite. It will also be understood that the controllers 712, 722 may utilize a control law or performance index, such as a Least Mean Squared Error (LMSE) control law or performance index. The transversal filters 710, 720 may include, for example, fractionally- and/or synchronously-spaced, feed-forward and/or decision-feedback filters. Those skilled in the art will recognize that different control laws (other than LMSE), such as, for example, zero-forcing or Kalman-based, may be used to form and/or update the transversal filter coefficients of transversal filters 710 and/or 720 and that the control laws 712 and 722 may be the same or different. Those skilled in the art will also recognize that different control law input signals may be required by the different control laws to derive update information for the plurality of transversal filter coefficients. It will also be recognized by those of skill in the art that the number of transversal filter coefficients per transversal filter need not be the same over the ensembles of transversal filters 710, 720. Some transversal filters may, for example, have seven (7) coefficients or taps, while others may have five (5) or only three (3) and some transversal filters may be limited to a single coefficient. In some embodiments, all transversal filters have an identical number of coefficients or taps (greater than or equal to one). Furthermore, in some embodiments, the architecture of each transversal filter of the ensemble of transversal filters of FIG. 7 may not be the same for all transversal filters of the ensemble. For example, some transversal filters may be synchronously-spaced, others fractionally-spaced, and others decision-feedback with either synchronously- or fractionally-spaced feed-forward sections.

The signals produced by the summing junctions 714, 724 are combined in a maximal ratio (or other) combiner (MRC) 730. The MRC 730 combines the estimated signals responsive to comparison of signal estimates generated by the MRC 730 with known signal information. The MRC 730 may combine the signals to optimize a ratio of the desired signal to noise and/or interference. General operations of maximal ratio combiners are known to those of skill in the art, and will not be discussed in further detail herein.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a satellite radiotelephone communications system, the method comprising:
   receiving first radio signals by a first satellite, the received first radio signals including a desired signal using a frequency and an interfering signal using the frequency;
   combining the first radio signals based on a first performance criterion to generate a first output signal;
   receiving second radio signals by a second satellite, the received second radio signals including a measure of the desired signal;
   combining the second radio signals based on a second performance criterion to produce a second output signal; and
   combining the first and second output signals to generate an estimate of the desired signal.

2. A method according to claim 1:
   wherein combining the first radio signals based on a first performance criterion to generate a first output signal comprises:
      determining a first timing for the desired signal as received by the first satellite;
      determining an error of the first output signal responsive to the determined first timing; and
      combining the first radio signals responsive to the determined error of the first output signal; and
   wherein combining the second radio signals based on a second performance criterion to generate a second output signal comprises:
      determining a second timing for the desired signal as received by the second satellite;
      determining an error of the second output signal responsive to the determined second timing; and
      combining the second radio signals responsive to the determined error of the second output signal.

3. A method according to claim 2:
   wherein determining a first timing for the desired signal as received by the first satellite comprises synchronizing to a timing reference for the desired signal;
   wherein determining an error of the first output signal responsive to the determined first timing comprises determining an error for known information in the first output signal responsive to the synchronizing; and
   wherein combining the first radio signals responsive to the determined error comprises combining the first radio signals responsive to the error for known information in the first output signal.

4. A method according to claim 1, wherein combining the first radio signals based on a first performance criterion to generate a first output signal comprises:

applying the first radio signals to a plurality of filters;
combining outputs of the plurality of filters to produce the first output signal; and
modifying at least one filter parameter responsive to the first output signal.

5. A method according to claim 1, wherein combining the first and second output signals to generate an estimate of the desired signal comprises maximal ratio combining the first and second output signals.

6. A method according to claim 1, wherein the first satellite serves a first terrestrial coverage area and wherein the second satellite serves a second terrestrial coverage area adjacent and/or overlapping the first coverage area.

7. A method according to claim 6, wherein respective ones of the first and second radio signals correspond to signals of respective satellite spot beams and/or antenna feeds.

8. A satellite radiotelephone communications system, comprising:
a first satellite that receives first radio signals including a desired signal using a frequency and an interfering signal using the frequency;
a second satellite that receives second radio signals including a measure of the desired signal; and
an interference-suppressing signal processor configured to combine the first radio signals based on a first performance criterion to generate a first output signal, to combine the second radio signals based on a second performance criterion to produce a second output signal, and to combine the first and second output signals to generate an estimate of the desired signal.

9. A system according to claim 8:
wherein the interference-suppressing signal processor is configured to determine a first timing for the desired signal as received by the first satellite, to determine an error of the first output signal responsive to the determined first timing, and to combine the first radio signals responsive to the determined error of the first output signal; and
wherein the interference-suppressing signal process is further configured to determine a second timing for the desired signal as received by the second satellite, to determine an error of the second output signal responsive to the determined second timing and to combine the second radio signals responsive to the determined error of the second output signal.

10. A system according to claim 9, wherein the interference-suppressing signal processor is configured to synchronize to a timing reference for the desired signal, to determine an output signal error for known information in the first output signal responsive to the synchronizing, and to combine the first radio signals responsive to the output signal error.

11. A system according to claim 8, wherein the interference-suppressing signal processor comprises:
a plurality of filters configured to receive the first radio signals;
a combiner configured to combine outputs of the plurality of filters to produce the first output signal; and
a controller operative to modify at least one parameter of the plurality of filters responsive to the first output signal.

12. A system according to claim 8, wherein the interference-suppressing signal processor comprises a maximal ratio combiner configured to combine the first and second output signals to generate the estimate of the desired signal.

13. A system according to claim 8, wherein the first satellite serves a first terrestrial coverage area and wherein the second satellite serves a second terrestrial coverage area adjacent and/or overlapping the first coverage area.

14. A system according to claim 8, wherein respective ones of the first and second radio signals correspond to signals of respective satellite spot beams and/or antenna feeds.

15. An apparatus, comprising:
an interference-suppressing signal processor configured to combine first radio signals from a first satellite based on a first performance criterion to generate a first output signal, to combine second radio signals from a second satellite based on a second performance criterion to produce a second output signal, and to combine the first and second output signals to generate an estimate of a desired signal.

16. An apparatus according to claim 15:
wherein the interference-suppressing signal processor is configured to determine a first timing for the desired signal as received by the first satellite, to determine an error of the first output signal responsive to the determined first timing, and to combine the first radio signals responsive to the determined error of the first output signal; and
wherein the interference-suppressing signal process is further configured to determine a second timing for the desired signal as received by the second satellite, to determine an error of the second output signal responsive to the determined second timing and to combine the second radio signals responsive to the determined error of the second output signal.

17. An apparatus according to claim 16, wherein the interference-suppressing signal processor is configured to synchronize to a timing reference for the desired signal, to determine an output signal error for known information in the first output signal responsive to the synchronizing, and to combine the first radio signals responsive to the output signal error.

18. An apparatus according to claim 15, wherein the interference-suppressing signal processor comprises:
a plurality of filters configured to receive the first radio signals;
a combiner configured to combine outputs of the plurality of filters to produce the first output signal; and
a controller configured to modify at least one parameter of the plurality of filters responsive to the first output signal.

19. An apparatus according to claim 15, wherein the interference-suppressing signal processor comprises a maximal ratio combiner configured to combine the first and second output signals to generate the estimate of the desired signal.

20. An apparatus according to claim 15, wherein respective ones of the first and second radio signals correspond to signals of respective satellite spot beams and/or antenna feeds.

* * * * *

UNITED STATES PATENT AND TRADEMARK OFFICE
CERTIFICATE OF CORRECTION

PATENT NO. : 8,670,705 B2  
APPLICATION NO. : 11/036637  
DATED : March 11, 2014  
INVENTOR(S) : Karabinis et al.

Page 1 of 1

It is certified that error appears in the above-identified patent and that said Letters Patent is hereby corrected as shown below:

In the Specification:
Column 9, Line 14: Please begin a new paragraph after "in (2) above;" in Line 14 so that it reads:
-- in (2) above;
       (4) Signals from --

Column 10, Line 11: Please correct "signal 523." to read -- signal 523'. --

Column 10, Line 22: Please correct "signal 523." to read -- signal 523'. --

Signed and Sealed this
Twenty-first Day of October, 2014

Michelle K. Lee
*Deputy Director of the United States Patent and Trademark Office*